UNITED STATES PATENT OFFICE.

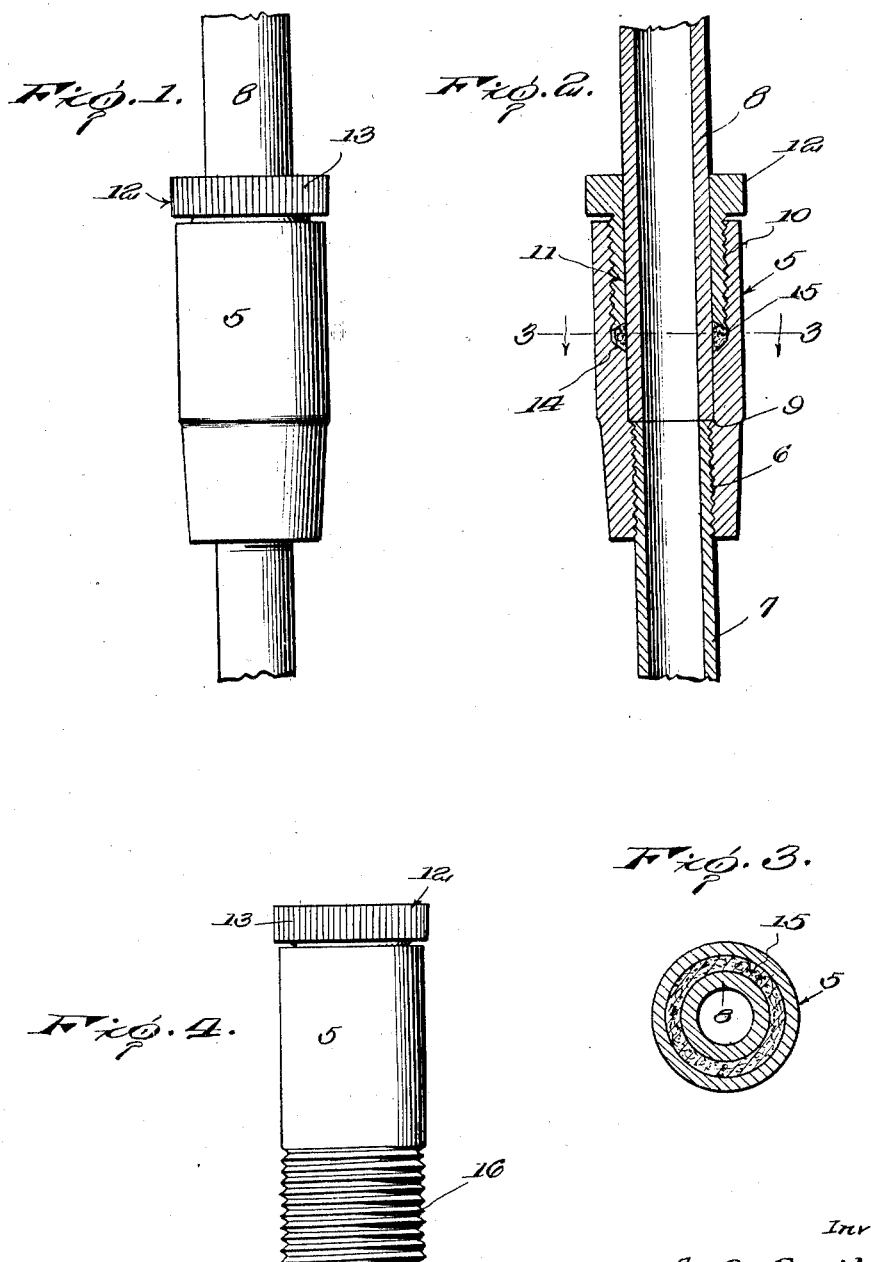

ALEXANDER C. SMITH, OF OLYMPIA, WASHINGTON, ASSIGNOR OF ONE-HALF TO THOMAS C. CHRISTENSEN, OF OLYMPIA, WASHINGTON.

UNION.

1,373,106.      Specification of Letters Patent.      Patented Mar. 29, 1921.

Application filed February 10, 1920. Serial No. 357,531.

*To all whom it may concern:*

Be it known that I, ALEXANDER C. SMITH, a citizen of the United States, residing at Olympia, in the county of Thurston and State of Washington, have invented certain new and useful Improvements in Unions, of which the following is a specification.

This invention relates to improvements in unions especially adapted for detachably connecting the meeting ends of pipes.

An important object of this invention is to provide a union of the slip joint type having novel means for joining the meeting ends of two pipe sections in such a manner that the water, steam or other liquid conveyed through the pipes will not be likely to leak at the meeting ends of the same.

A further object of this invention is to provide a union especially adapted for use in making radiator connections, waste line connections and so forth in a highly convenient and expeditious manner.

A further object of the invention is to provide a union adapted to slidably receive one of the pipe sections connected thereto so that the said pipe sections need not exactly meet.

A further object of the invention is to provide a union of the class described which is simple to apply, of highly simplified construction and cheap to manufacture.

Other objects and advantages of the invention will be apparent during the course of the following description.

In the accompanying drawing forming a part of this application and in which like numerals are employed to designate like parts throughout the same:

Figure 1 is a side elevation of the improved slip joint union applied,

Fig. 2 is a central vertical longitudinal section through the same,

Fig. 3 is a horizontal section taken on line 3—3 of Fig. 2, and

Fig. 4 is a side elevation of a slightly modified form of the invention.

In the drawing wherein for the purpose of illustration is shown a preferred embodiment of the invention, the numeral 5 generally designates the body of the union which, as illustrated in Fig. 2, is of cylindrical formation and is interiorly screw threaded at one end as indicated by the numeral 6, for connection with a pipe section 7. The pipe section 7 is obviously capable of a variety of uses such as conveying water to or from a radiator or carrying off the waste from a sink or basin. For the purpose of this description it will be presumed that the pipe section 7 is used in connection with the water supply to a radiator though it is not intended in any way to limit this invention to such use. A second pipe 8 may be connected at its upper end with a radiator and is arranged in longitudinal alinement with the pipe section 7 so that the water may be conveyed from the pipe section 7 into the section 8. With particular reference to Fig. 2 it will be observed that the end of the pipe section adjacent the pipe section 7 is smooth on both its inner and outer sides and is arranged within one end portion of the cylindrical body 5 with its forward end in contact with the adjacent end of the section 7. The cylindrical body 5 is provided with an interiorly arranged annular shoulder 9 against which the inner end of the pipe section contacts for limiting its movement through the cylindrical body. The screw threads 6 within the body 5 terminate at the annular shoulder 9 so that the lower pipe section 7 will not be permitted to extend into the cylindrical body beyond the annular shoulder 9.

The body 5 is interiorly enlarged at a point spaced upwardly from the annular shoulder 9 and is interiorly screw threaded, as indicated at 10, for receiving a sleeve nut 11. The sleeve nut 11 is provided at its outer end with an annular gripping portion 12 adapted to be engaged by a Stilson wrench when it is desired to either apply or remove the nut. However, the gripping portion 12 may be polygonal sided for providing gripping means for a wrench other than a Stilson wrench. In this case, however, the annular gripping portion 12 is provided with serrations 13 which provide a means whereby the wrench may be securely engaged with the nut.

The interior enlargement of the upper portion of the cylindrical body 5 forms an annular shoulder 14 surrounding the inner portion of the pipe section 8 for forming a support for the annular packing 15. The annular shoulder 14 and the inner end of the sleeve nut 11 are beveled in opposite directions so that as the sleeve nut is threaded in position the packing will be forced into liquid-tight engagement with the adjacent portion of the pipe section 8. By this construction the pipe section is securely held within the cylindrical body 5 and the leakage of the fluid beyond the packing is rendered practically impossible. As the occasion requires the sleeve nut may be rotated for further tightening the packing 15. In the manufacture of the improved union, the sleeve nut 11 has an internal diameter sufficient to permit of the sliding movement of the smooth pipe section 8 upon inserting the same into the cylindrical body.

In connecting the pipe sections 7 and 8, it is not necessary that the meeting ends of the same be exactly in contact as shown in the drawings, but it is sufficient that the inner end of the pipe section is extended beyond the packing 15 and that the section 7 be threaded into the body a sufficient distance to provide a water-tight connection. After the sections have been arranged within the cylindrical body, the sleeve nut is threaded tightly into contact with the annular packing 14 so as to provide a water-tight connection between the body and section 8.

By thus providing a union of this character, radiators, etc., may be readily connected to the feed and return pipes in such a manner that leakage of water is rendered unlikely. With reference to Fig. 1, it will be observed that when applied the union makes an extremely neat appearance and therefore is not objectionable in places where the same is exposed to constant view.

In the form of the invention illustrated in Fig. 4, the cylindrical body 5 has one end exteriorly screw threaded, as indicated at 16, for connection with water conveyers having interior screw threads.

Having thus described the invention, what is claimed as new is:

A union of the class described including a cylindrical body having one end portion interiorly enlarged and screw threaded, said interior enlargement forming an annular shoulder intermediate the ends of said body, an exteriorly screw threaded sleeve nut extending into the enlarged portion of said body, a packing confined between the forward portion of said sleeve nut and said annular shoulder, said annular shoulder and the forward end of said sleeve nut being beveled for forcing the packing inwardly, a smooth pipe section slidably but closely arranged in said cylindrical body and secured in position by said packing, the other end portion of said cylindrical body being interiorly screw threaded, and a pipe section threaded into said second named screw threaded end portion of the body, said body being provided with an annular shoulder at the inner end of said second named screw threads for limiting the movement of said sliding pipe section in one direction and the extent of the threaded portion of the second pipe section being such as to prevent entrance of said section beyond the second annular shoulder of the cylindrical body.

In testimony whereof I affix my signature.

ALEXANDER C. SMITH. [L. S.]